United States Patent
Herberger et al.

(10) Patent No.: US 7,512,886 B1
(45) Date of Patent: Mar. 31, 2009

(54) SYSTEM AND METHOD OF AUTOMATICALLY ALIGNING VIDEO SCENES WITH AN AUDIO TRACK

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 637 days.

(21) Appl. No.: 10/826,074

(22) Filed: Apr. 15, 2004

(51) Int. Cl.
*G06F 3/00* (2006.01)
(52) U.S. Cl. .................................. 715/723
(58) Field of Classification Search .......... 715/722, 715/725, 726, 723
See application file for complete search history.

(56) References Cited

U.S. PATENT DOCUMENTS

| | | | |
|---|---|---|---|
| 5,046,004 A | 9/1991 | Tsumura et al. | |
| 5,233,438 A | 8/1993 | Funshashi et al. | |
| 5,247,126 A | 9/1993 | Okamura et al. | |
| 5,416,526 A | 5/1995 | Yamamoto | |
| 5,519,828 A | 5/1996 | Rayner | |
| 5,649,060 A | 7/1997 | Ellozy et al. | |
| 5,668,639 A | 9/1997 | Martin | |
| 5,712,949 A | 1/1998 | Kato et al. | |
| 5,732,184 A | 3/1998 | Chao et al. | |
| 5,758,093 A | 5/1998 | Boezeman et al. | |
| 5,815,634 A | 9/1998 | Daum et al. | |
| 5,863,206 A | 1/1999 | Narusawa et al. | |
| 5,889,514 A | 3/1999 | Boezeman et al. | |
| 5,889,519 A * | 3/1999 | Boezeman et al. | 715/723 |
| 5,895,124 A | 4/1999 | Tsuga et al. | |
| 5,999,173 A * | 12/1999 | Ubillos | 715/724 |
| 5,999,696 A | 12/1999 | Tsuga et al. | |
| 6,188,396 B1 | 2/2001 | Boezeman et al. | |
| 6,285,825 B1 | 9/2001 | Miwa et al. | |
| 6,336,093 B2 | 1/2002 | Fasciano | |
| 6,469,711 B2 * | 10/2002 | Foreman et al. | 715/723 |
| 7,142,250 B1 * | 11/2006 | Black | 348/515 |
| 2001/0036355 A1 | 11/2001 | Kelly et al. | |
| 2002/0069073 A1 | 6/2002 | Fasciano | |
| 2003/0160944 A1 * | 8/2003 | Foote et al. | 352/1 |
| 2004/0027369 A1 | 2/2004 | Kellock | |

* cited by examiner

*Primary Examiner*—Thanh T Vu
(74) *Attorney, Agent, or Firm*—Fellers, Snider, Blankenship, Bailey & Tippens, P.C.; Terry L. Watt

(57) ABSTRACT

There is provided herein a system and method for automatically aligning audio and video tracks of a multimedia work, wherein in one preferred embodiment change points or "markers" are located in the accompanying audio work and then transitions are constructed around "breaks" or discontinuities in the video work to match the audio markers. This produces the impression that the audio and video tracks are in synchronization. In another preferred embodiment, video clips around the audio markers are shortened or lengthened according to predetermined rules to cause the video work to be aligned with the audio work.

5 Claims, 5 Drawing Sheets

SYSTEM AND METHOD OF AUTOMATICALLY ALIGNING VIDEO SCENES WITH AN AUDIO TRACK

FIELD OF THE INVENTION

The present invention relates generally to the field of picture/video data and audio data processing. More particularly, but not by way of limitation, the present invention relates to an automatic process which provides automatic alignment of picture/video data to audio data to generate a pleasing composition of both audio data and picture/video data.

BACKGROUND OF THE INVENTION

In recent years the development of digital video cameras and digital photo cameras has lead to a widespread adoption of these devices by the end users. Further, because of the widespread adoption of these devices and the availability of personal computers more and more inexperienced users are seeking to create multimedia works by combining digital videos and still images with background music.

There are a large number of software products that allow a user to compose, edit, and play his or her own multimedia work. These software solutions usually offer the user a broad range of media editing options such as, for example, cutting/pasting, arranging, organizing, applying effects, etc. Typically, such programs allow a user to store an intermediate step or the completed project on computer-readable media. Obviously a properly composed and edited video or photo story can be much more entertaining and enjoyable for the viewer than the raw footage collected by the photographer, which footage may contain large sections of unusable or irrelevant material.

Generally speaking, most multimedia editing software provides the user with the ability to edit the video footage and to insert specific audio data (e.g., music or over dubbed narration) that is to be used as an accompaniment. In such a circumstance, no effort is made to coordinate the video and audio: the audio is simply inserted and played (by default) sequentially for its entire length.

Because of the unrelated nature of the audio and video tracks, somewhat disappointing results can be produced. This can be quite noticeable to the audience and, as a consequence, the user experience of watching the created composition is not the best possible one and this situation can only be somewhat disappointing for the user who created the composition.

Thus, what is needed is a method for automatically aligning video footage with subsequently added audio data so that the two are coordinated at least to the point where the audio/video combination is not noticeable by the audience. Additionally it is preferred that the alignment process features an automatic selection of specific sections of both the audio data and the video data automatically without user intervention.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a system and method for automatically aligning audio and video tracks of a multimedia work, wherein change points or "markers" are located in the accompanying digital audio work and then transitions are constructed around "breaks" in the video work to give the impression that the two works are in synchronization. It should be noted that the audio work will preferably be music, although it might also be spoken text, sound effects, etc.

According to a preferred embodiment the instant invention begins with the selection of the video data that is to be used as input. For example, the user might first select one or more video clips which would preferably be inserted into an video track and displayed within a graphical user interface. Typically, such graphic user interfaces contain on-screen displays of video (and audio as discussed below) tracks, an associated timeline, editing tools, etc. The user will preferably be able to edit and add to the video data using standard video editing functions. For example, clip-to-clip transitions can be provided between successive clips, video effects may be applied to one or all clips, etc.

As a next preferred step, the user will select the audio data that he or she wants to use as an accompaniment to the video footage. The audio data is preferably automatically inserted into a track in the appropriate region of the graphical user interface that is provided for that purpose.

As a next preferred step the user will select one or more algorithms for identifying points in the audio work where changes occur. Generally speaking, these algorithm will preferably analyse the material in the audio track according to specific criteria, which might include determination of the musical rhythm (beat/time signature) of the music, identification of changes in its volume, location within the audio track of a chorus or refrain, identification of changes in musical key, bar locations, strophe and refrain, etc. The change points in the audio material are then preferably marked according to the result of the analysis process and such markers are displayed within the audio track on the computer screen. Preferably, the user will be able to impose some constraints on or control over the selection process. For example, there might be many volume changes within a musical work, but only two or three substantial volume changes, in which case thresholding, filtering, etc., could be used to reduce the number of markers obtained from the audio volume analysis.

The video data will preferably be similarly analysed to locate and mark its natural breaks. Such breaks might be located between two adjacent video clips, at the start (or end) of a user-specified effect or transition, or within a video clip (e.g., if the illumination changes drastically, if the sound level changes, etc.). As was discussed previously, preferably some amount of screening/filtering will be applied to the collection of raw video markers to reduce their numbers. At or about this same time, each video clip will be assigned a base length which reflects its unedited length.

As a constraint on the alignment process, the instant invention preferably uses a minimum and maximum allowable clips length, together with the defined base length of the video clips, to help determine which of the potentially many available audio markers would be acceptable for use in connection with a given video break. The base length of a video clip can either be defined by the user or could be set by default within the program and preferably refers to the actual length of the clip, before its inclusion in the video work, where its perceived length might be changed by transitions or special effects. The maximum clip length preferably depends on the timing of the following video clip (i.e., generally a user will not want to extend one clip to the point where it overlays another) and the minimum clip length will similarly depend on the timing of the clip that follows (i.e., generally a user will not want to shorten a clip to the point where a video transition cannot bridge the space between it and the clip that follows). Note that any of these values might be defined by the user or determined automatically by the instant invention.

Given a collection of audio breaks and video markers, in one preferred embodiment the instant invention aligns the video breaks (e.g., cuts or transitions) with the markers that have been identified in the audio data. Although the alignment might be performed in many ways, one preferred arrangement successively selects each of the video breaks and then searches the audio markers for one that is proximate thereto. A check is then preferably made against any user or computer established screening criteria before a video transition is applied (or scheduled to be applied) at the time location indicated by the candidate marker. The standard alignment process operates in a horizontal manner from left to right (with respect to the computer screen, i.e., in the direction of increasing time) along the video and audio tracks, but could clearly also operate in a right to left or a decreasing time direction.

In another preferred embodiment of the alignment process, the instant invention uses a more elaborate method of locating change point markers in the audio work. In brief, in this preferred embodiment multiple criteria are used to locate markers in the audio data. Of course, that should yield a larger number of potential markers against which to compare the breaks/discontinuities in the video data. Preferably, though, the audio markers will be matched against the video data according to an order specified by the user. For example, the algorithm might attempt, first, to match markers produced by a "volume level" algorithm. Then, if none of the markers that were obtained by the "volume" method are satisfactory, the algorithm could use markers produced by a beat detection algorithm, etc. Needless to say, because of the increased complexity of this embodiment, additional computer processing power may be needed.

Thus, it should be clear to those of ordinary skill in the art that the methods described herein would be a tremendous addition to the capabilities of a video editing software. This method would enable a user to create sophisticated multimedia compositions in which both audio and video data are in substantial alignment, which alignment enhances the watching experience of a user created composition.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

DESCRIPTION OF THE PREFERRED EMBODIMENTS

Figure 8:
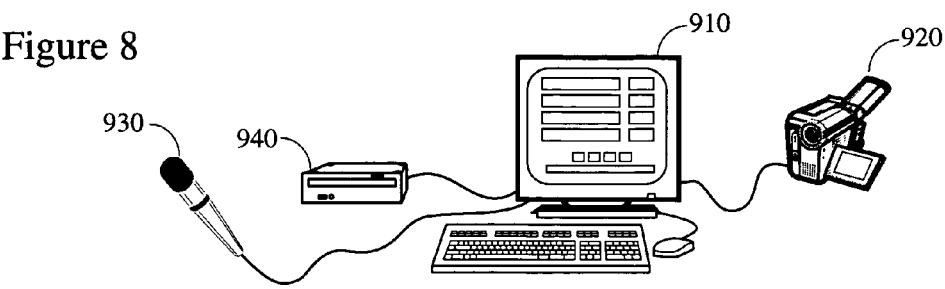
FIG. 8 illustrates a preferred environment of the instant invention.

Referring now to the drawings, wherein like reference numerals indicate the same parts throughout the several views, there is provided a preferred system and method for enabling a user to create a multimedia composition wherein video footage, for example video clips or still photo images, are aligned so as to accompany user selected audio data.

By way of general explanation and in accord with the preferred embodiment, it is to be understood that when the phrase "aligning video data with audio markers" is used herein that usage will preferably be interpreted as meaning adjusting the start and stop times of the video transitions to match the occurrence of markers in the audio works. That being said, it would also certainly be possible to synchronize a video work with an audio work by lengthening and shortening the constituent film clips to match the location of the audio markers. However, that would not be the preferred embodiment. Generally speaking, the videographer will want to leave the timing of his carefully crafted video cuts unchanged by the alignment process. Of course, it is certainly possible, and could readily be offered as a program option, that the base lengths of the video clips might be extended (e.g., by slowing down the frame rate, freezing on the last frame, etc.) or shortened in order to make the transitions align with the audio markers.

However, for purposes of the instant embodiment it should be understood that the invention preferably seeks to determine how best to align the audio and video track without modifying the video work any more than is necessary, the end result being a multimedia work that features video transitions that occur, for example, on the beat of the music, at tempo changes, at key changes, etc. The overall impression will be that the entire work has been crafted according to the structure of the music when, in fact, the video work was constructed independently of the music. The selection logic defining when and which audio markers are selected will later be described more detail below.

As is generally indicated in FIG. 8, at least a portion of the instant invention will be implemented in the form of software running on a user's computer 910. Such a computer will have some amount of program memory and hard disk storage (whether internal or accessed via a network) as is conventionally utilized by such units.

Additionally it is possible that an external camera 920 of some sort will be utilized with—and will preferably be connectible to—the computer so that video and/or graphic information can be transferred to and from the computer (FIG. 8). Preferably the camera 920 will be a digital video camera, although that is not a requirement, as it is contemplated that the user might wish to utilize still images from a digital still camera in the creation of his or her multimedia work. Further, given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing hardware between it and the computer is utilized. Additionally a microphone 930 might be utilized so that the user can add voice-over narration to the multimedia work and a CD or DVD burner 940 could be useful for storing in-progress or completed works.

Figure 1:
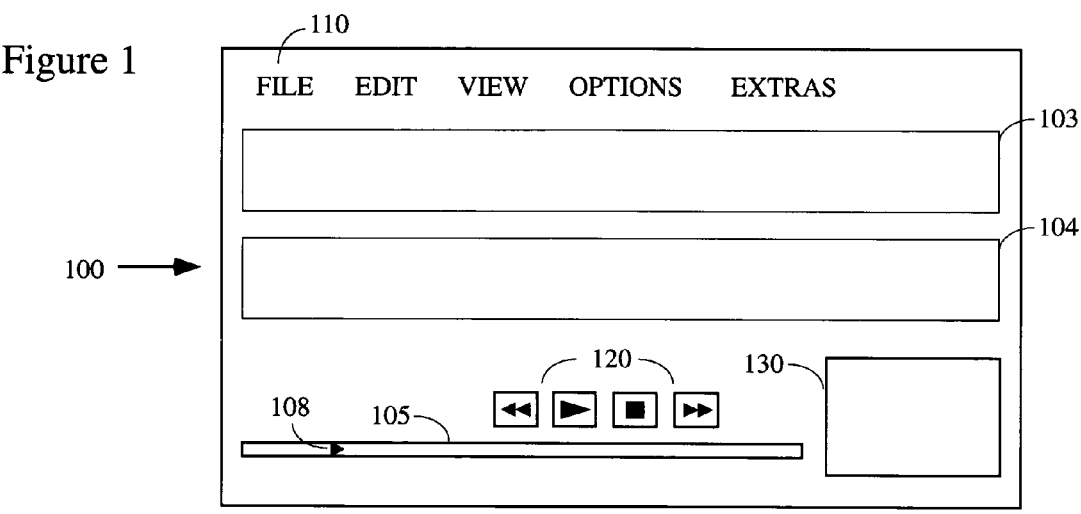
FIG. 1 depicts an embodiment of the graphical user interface of the instant invention

According to FIG. 1, in a preferred embodiment a user of the instant multimedia editing system will be presented with a computer screen display 100 which contains a display of components of the sort indicated in this figure. For example, and as is typical for such editing programs, menu items 110 will be provided to allow a user to interact with the underlying program and would typically provide for options that allow the user to read, save, and edit the multimedia work. Additionally the user will preferably be initially provided with at least two empty tracks, one of which is designed to contain video information 104 and the other of which would typically contain audio data 103. In both cases, the user will likely be expected to provide the data needed to fill these tracks: video clips would be provided for use in the video track 104 and audio clips for inclusion in the audio track 103. Note that, although for purposes of illustration only a single audio track is shown in FIG. 1, in most cases at least two audio tracks (e.g., stereo) would be utilized to contain the audio information.

On-screen transport controls 120 are preferably styled to resemble their counterparts on a conventional VCR and provide a way for the user to use a computer mouse to control playback of the multimedia work through the use of functions such as rewind, play, stop/record, fast forward, etc. Those of ordinary skill in the art will recognize that such transport controls 120 are commonplace and well known in media editing programs. It is typical in such programs to devote some portion of the screen to a view window 130 wherein the multimedia work may be played during the time that it is being built and edited. Time line 105 is used in conjunction with a position indicator 108 to give the user a general indication of the location within the multimedia work of the multimedia content displayed within the view window 130.

Figure 2:
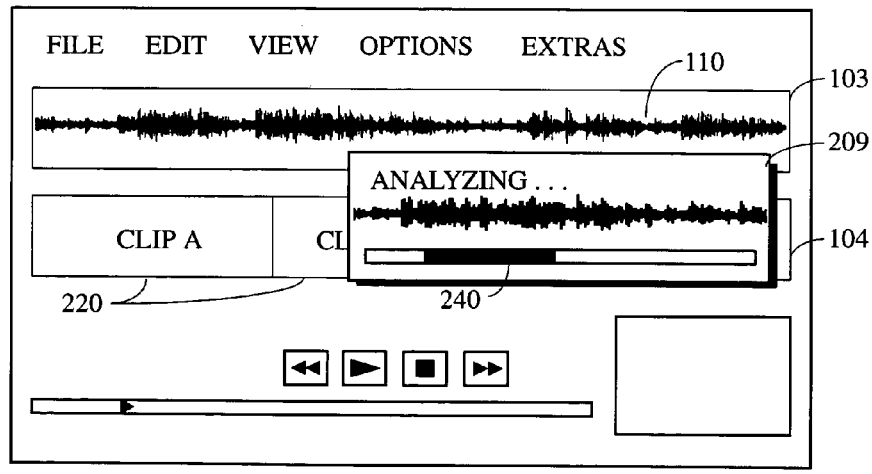
FIG. 2 illustrates the embodiment of FIG. 1 after inclusion of audio and video data and during the analysis of the audio work.

Turning next to FIG. 2, this figure illustrates how the screen of FIG. 1 might appear after the user has selected audio 210 and video 220 data for inclusion in the work. Additionally this figure illustrates one preferred embodiment of the sort of user feedback 209 that will preferably be provided as part of the analysis step, wherein an analysis window 209 containing data that has been extracted from the audio track is displayed on top of the standard editing screen, with position bar 240 giving a general indication of the location within the larger audio track of the extracted and currently-analysed audio data 250.

Figure 3:
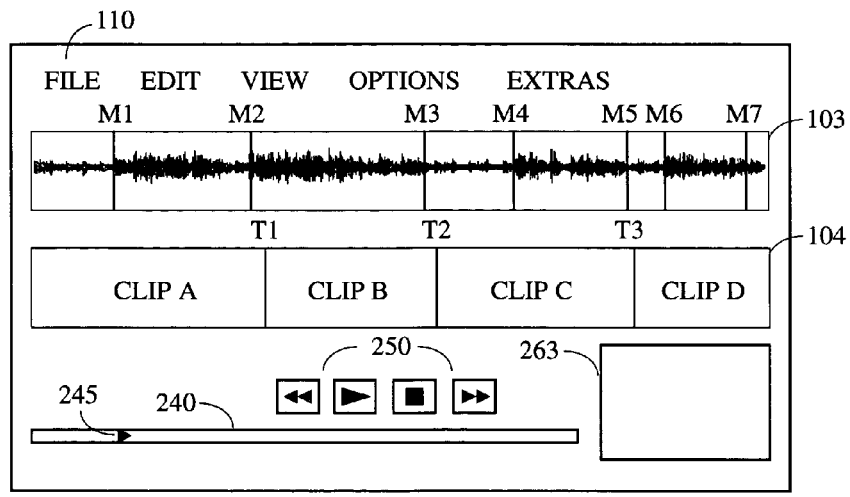
FIG. 3 depicts the instant invention after the analysis step and the posting of audio and video markers.
Figure 4:
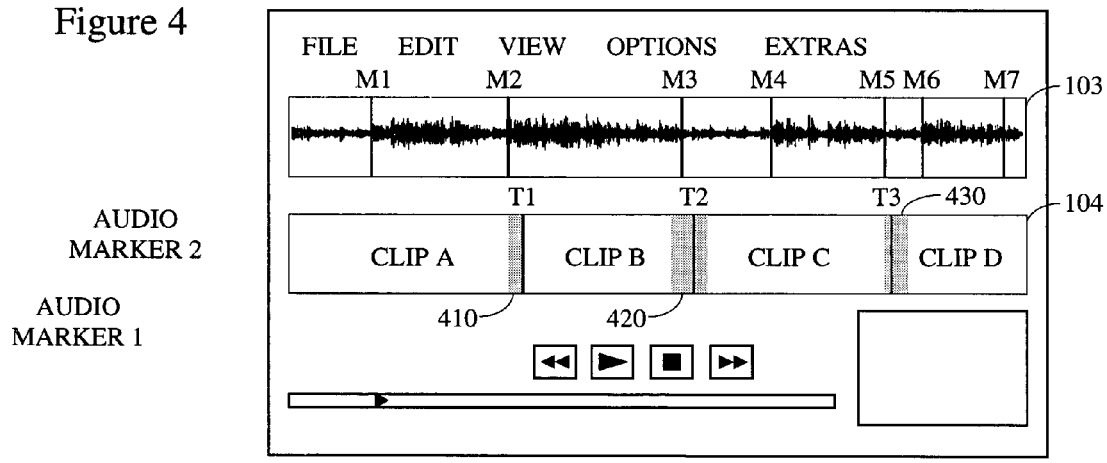
FIG. 4 illustrates one preferred method of matching audio markers with video markers.

FIGS. 3 and 4 illustrate in more detail some preferred aspects of the alignment process. FIG. 3 illustrates a preferred computer screen display a case wherein the audio data 110 has been analysed and audio markers (indicated by M1 to M7) have been posted above the screen region that contains the audio track 103. Methods for automatically locating such markers will be discussed in greater detail below. Additionally, video discontinuities T1 to T3 have been identified in connection with the video track 104 which contains Clips A, B, C, and D. In this example, the video discontinuities that have been marked are all located between two time-adjacent video clips (e.g., the break T1 separates Clip A and Clip B).

Preferably a transition will be assigned to each of the discontinuities in the video work. Note that the "transition" between two clips might be a simple as an abrupt change from one clip to next (i.e., no conventional transition) or as complex as computer morphing of the last frame of, say, Clip A to match the first frame of Clip B. These transitions would typically be selected by the user from a list of commonly available transitions (e.g., wipes, fades, cross fades, zoom in, zoom out, push, overlap, iris dilation, etc.). Note that, although the contents of the video track 104 are depicted in FIG. 3 as a collection of separate video clips, that is only a preferred embodiment and it is well within the scope of the instant invention to have one or more video breaks and, hence, transitions be placed within the body of a larger video clip.

FIG. 4 illustrates in a general way a preferred screen appearance after the alignment process has taken place. As can be seen, in the preferred arrangement the transitions 410, 420, and 430 have been adjusted in duration to align them with the markers M1-M7 in the audio track 103. For example, the time duration of Transition T1 410 (e.g., a cross fade between Clips A and B) has been lengthened into the ending of Clip A to align the start of the cross fade transition T1 with Marker M2. Similarly, the time duration 420 of Transition T2 has been adjusted by expanding it into both Clips B and C (transition 420). Finally, the time duration 430 of transition T3 has been expanded in the direction of Clip D, with the start of its transition being approximately equal to marker M5.

Figure 5:
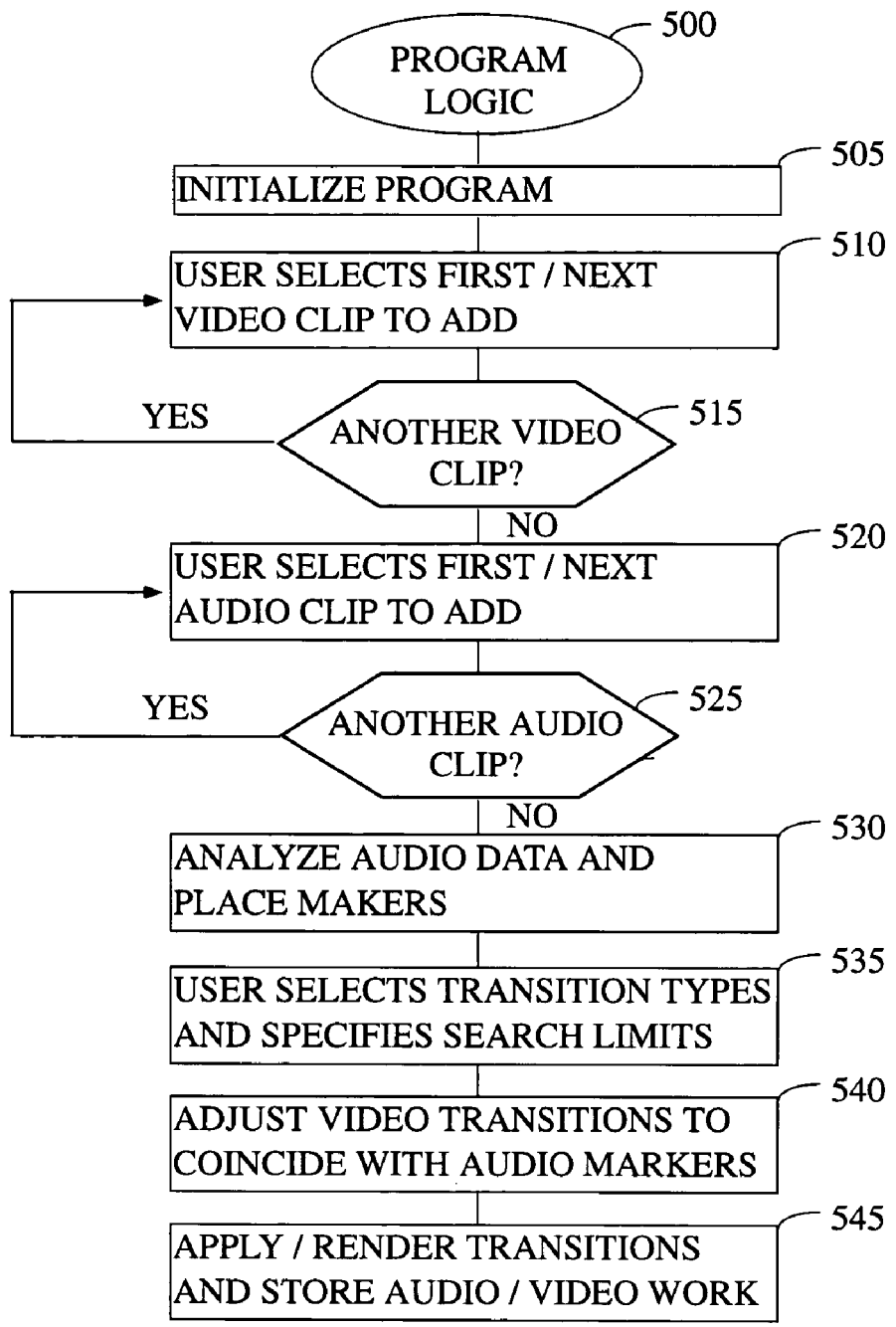
FIG. 5 contains a flowchart which illustrates some principal steps in the preferred method of the instant invention

FIG. 5 contains an overview of the preferred operating logic 500 of the instant invention. As a first preferred step 505, the program will be started and initialised according to methods well known to those of ordinary skill in the art. Next, the user will preferably select one or more video clips for inclusion in the multimedia work (steps 510 and 515). At least one such video clip is required, although a user will typically want to utilize several short clips. As is conventionally done, the user will preferably select audio or video clips for inclusion in the multimedia work through a standard file "open" option within the menu items 110. Note that the term "video data" should be construed in its broadest sense to include any of the many possible sorts of media data which could be added to these tracks, depending on the provisions made by the programmer and the needs of the user. Next, the user will preferably be prompted to select one or more audio works (steps 520 and 525) for inclusion in the audio track 103.

As a next preferred step, the user will signal to the computer that an analysis of the audio data should be performed (step 530). One product of this analysis (discussed in more detail below in connection with FIG. 6) is the selection and posting of the audio markers (e.g., M1 to M7 of FIGS. 3 and 4). Next, the user will typically request that the data in the video track be analysed for breaks and/or the user might manually determine where such breaks should appear in the video work (e.g., markers T1, T2, and T3 in FIGS. 3 and 4). Obvious locations for breaks include, by way of example, junctions between time-adjacent video clips, locations within a video clip where substantial changes in illumination level occur within the space of a few frames, locations where there are substantial changes in the quantity of on-screen motion or activity, etc. Any of the foregoing might be automatically designated as a location where a video marker could be placed. Preferably the user will thereafter determine which transition effects will be applied at each video marker location, with these effects typically being selected from a menu of standard transitions, but such selections could obviously be made by the program instead. Additionally it should be noted that the algorithms for identifying scene cuts in an existing video work depend on a number of different factors and parameters. Thus, it is not unexpected that the user might wish to review the automatic placement of the scene cuts/transitions and alter such by moving, deleting, adding to, etc. them. As a consequence, it is anticipated that such editing options will typically be provided to the user. Finally, it is also anticipated that a user might have manually flagged certain locations within the video work for transitions and/or alignment. If that is the case, it is preferred that the instant algorithm would leave those marks undisturbed.

Given the audio markers located during the analysis step, the instant invention will preferably next begin the alignment of the audio and video works (step 540) according to the method illustrated in FIG. 7, which figure will be discussed in some detail below. Finally, the resulting multimedia work will be rendered (if necessary) and written to disk or other storage medium (step 545). That is, those of ordinary skill in the art will recognize that in the case of more complex transitions it may be necessary to calculate the resulting video images as a separate step (rather than calculating them in real time as they are selected by the user).

Figure 6:
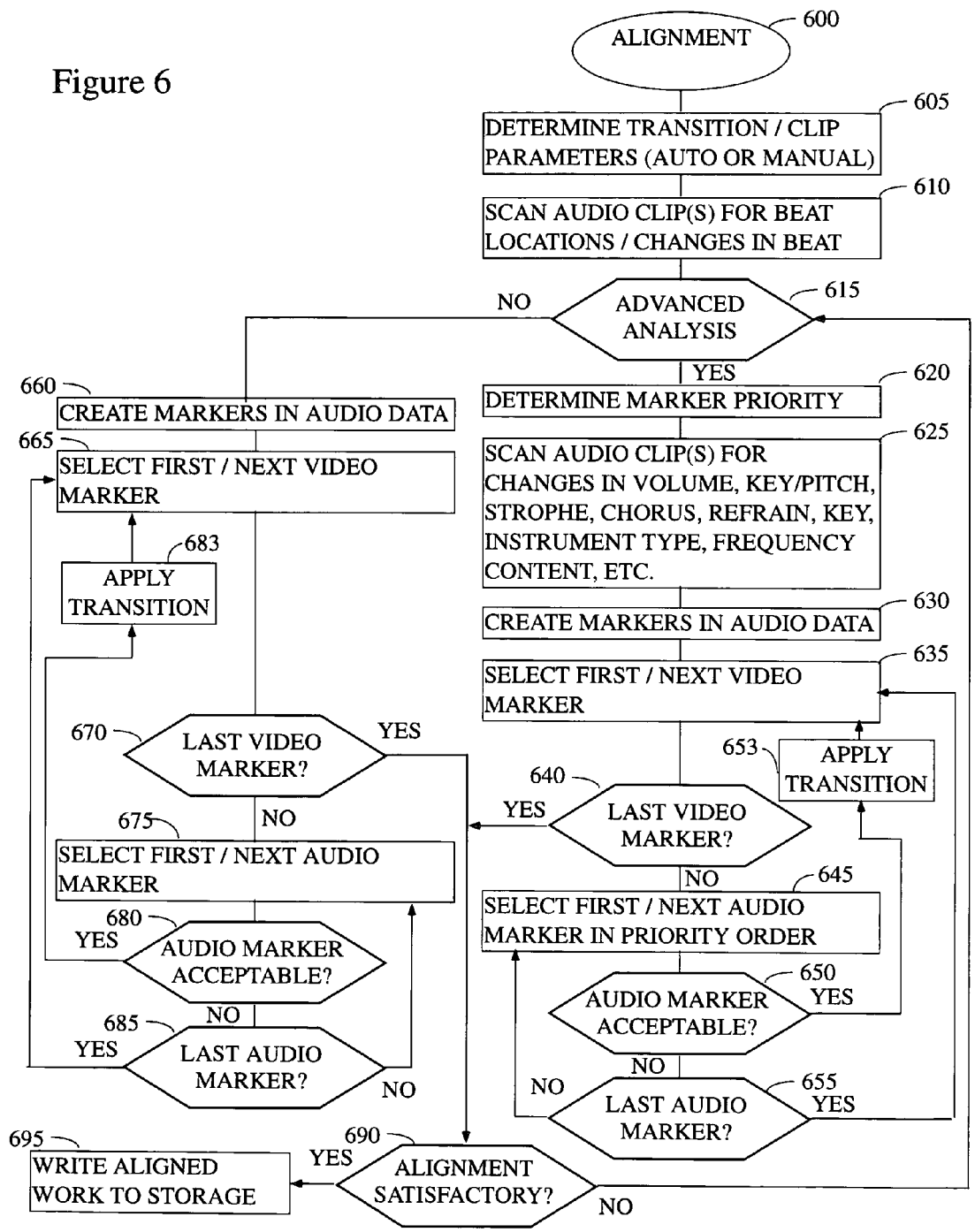
FIG. 6 illustrates a preferred operating logic of the instant alignment method.

Turning now to FIG. 6 wherein a preferred method of aligning video transitions 600 is illustrated, as a first preferred step 605 some limitations will be set on the parameters of the transitions and on lengths of the video clips that result after application of the transition. Note that this step might be done either manually or automatically. For example, it is anticipated that a user might wish to specify limits on either (or both) the transition duration and the length of the clip remaining after application of the transition. Although these parameters might take many forms, it is preferred that the user be able to specify the maximum and minimum transition duration and the maximum and minimum clip length after application of the transition. As a specific example, a user might wish to specify that a transition between two adjacent video clips not be shorter than 5 seconds nor longer than 10 seconds. Further, the user might want the first video clip to contain between 35 and 40 seconds of unobscured video after application of the transition and, similarly, the user might require that the second/subsequent video clip be between 40 and 55 seconds in length after application of the transition. Inconsistent values of these parameter choices could readily be called to the attention of the user for his or her correction, or, that discontinuity could simply ignored in the alignment process, etc. Also, it should be noted that the transition that is applied at a video marker need not take equal amounts of time from each clip but could instead take, say, 2 seconds from the leading clip and 8 seconds from the trailing clip. Indeed, this might be preferred in order to emphasize a particular musical mark-up event. Consider, for example, a ten second fade-to-black transition that is positioned by the instant method to start when a cymbal crashes in the accompanying musical work. If that cymbal crash occurs near the very end of the leading clip it would be logical to extend the transition (if the other parameters allow it) into the subsequent clip otherwise, if the transition were centered on the crash, the viewer would see the screen darken and then hear the crash. Clearly, a user's choice should ultimately control which of the alternative arrangements is more effective.

As a next preferred step, 610, the audio work will be scanned to determine the location of natural beats in the music and/or sections of the music where the beat changes. An audio marker will be assigned to each such location. Obviously, this process has the potential to yield a very large number of markers so, in some embodiments, that number will be reduced by filtering (e.g., by selecting only the first beat of a measure, choosing every tenth beat, choosing beats that correspond to the beginning or ending of phrases in the musical work, etc.). It should also be noted that, if necessary, the video work could also be scanned at this point to locate breaks or discontinuities within it and this would be especially useful if the user had imported lengthy clips into the program. Otherwise, the time borders between adjacent video clips could be automatically marked as candidates to receive transitions subject, of course, to review by the user.

The program next branches (step 615) depending on whether a minimal or advanced analysis is to be performed. In the event that the minimal analysis is selected, the program will preferably post the beat-based markers in the audio data (step 660) and begin to sequentially process the video markers (steps 665 through 685). As part of the preferred process, a video marker will be selected (step 665). The selected video marker will be compared to the audio markers in its vicinity (i.e., steps 675, 680, and 685) to see if any of these markers is acceptable according to the parameters selected by the user (step 680). If an audio marker is located that is acceptable, the selected transition will be preferably applied (step 683)—or scheduled for application during rendering—according to the parameters selected by the user (or, according to the default parameters, etc.). Means for determining whether or not a marker is acceptable will be discussed below. However, if there is no audio marker among all those that have been located that is satisfactory (step 685), the program preferably will move on to the next video marker and leave the currently selected video marker unmodified (steps 685 and 665).

In the event that the user has opted for a more advanced analysis (the "yes" branch of step 615), the program will preferably continue by performing additional analyses to look for other sorts of changes in the audio where markers might be located. As a first preferred step of this process, a priority will be established for each type of marker (step 610). That is, a determination will preferably be made by the user as to the order in which the markers that have been located by the next step (step 625) will be searched during the alignment process which follows.

Next, the audio clip or clips will preferably be scanned for additional sonic variations that could serve as marker locations (step 625). Preferably, this process will be initiated by the user although it could certainly take place automatically. In either case, it is anticipated that several different detection and scanning schemes will be employed and they will preferably be carried out sequentially on the audio data. For example, some preferred analyses include an examination of the musical work or clip for entry into/exit from a chorus or verse, changes in musical key or pitch, changes in strophe or other musical phrasing, changes in frequency content/centre frequency (e.g., possibly representing the occurrence of solos by different musical instruments), timbre, lead instrument, volume, etc. Those of ordinary skill in the art will recognize that these properties are just a few of the many that could potentially be used.

Each of the different analyses of step 625 will potentially yield its own set of audio markers. Thus, it might be desirable in some instances to reduce the total number of audio markers, e.g., where a very large number of closely spaced change points have been identified. This might be done in many ways including, without limitation, selecting every second, third, etc. marker and eliminating the others; selecting only those markers which exhibit changes in song parameter values greater than a predetermined threshold value; recalculating the marker locations using more strict criteria for finding a change in a musical parameters; etc.

As a next preferred step markers will be posted in the audio data (step 630). Preferably, there will be some on-screen indication of each marker's location, although that is not required. Still, it would likely be desirable from the user's standpoint to visibly indicate the positioning of such markers and these graphical indicia would aid the user in controlling the quality of the finished product.

Then, the instant invention will preferably enter a loop (steps 635 through 655) which is designed to match video markers with nearby audio markers in a manner similar to that discussed before in connection with loop 665-685. However, according to the preferred advanced analysis method the markers are examined in a priority order established by the user or the programmer (step 645). For example, if the user has decided that key changes are to be given priority over entry into/exit from a chorus or refrain, as part of step 645 those candidate markers that were identified by locating key changes would be examined first to see if any of them would be acceptable (step 650). If such a marker proved to be acceptable, it would be selected for use with that subject video transition. However, and continuing with the example, only if none of the key change markers proved to be acceptable for use with the selected video transition, would the markers associated with entry/exit be examined. As might be suspected, if the second type of maker does not yield an acceptable solution the program could search further using even lower priority markers. As a consequence, any alignment that is created according to this algorithm will tend to be based on the markers located by the highest priority algorithm, although other markers will likely be used for at least some transitions.

As a next preferred step, if the currently selected audio marker is satisfactory (step 650) the transition that has been assigned to the video marker will be applied or, alternatively, flagged for application when the multimedia work is rendered.

After all of the video transitions have been examined, the program will preferably give the user an opportunity to review the completed work (step 690) and make corrections if so desired. Additionally, the program will preferably write the aligned multimedia work to storage for subsequent playback or additional editing.

Figure 7:
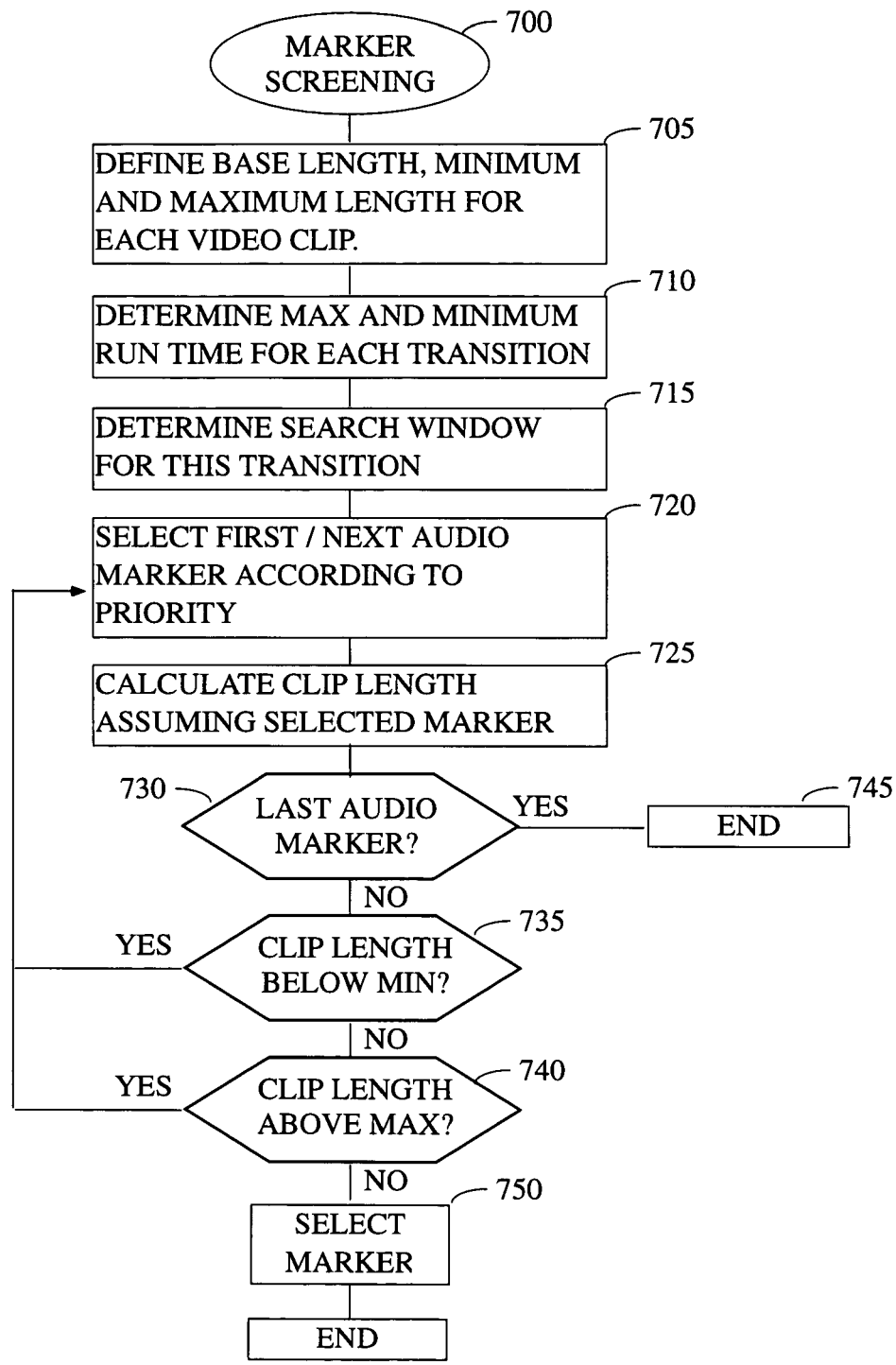
FIG. 7 contains a flowchart that lists some of the principal steps in the process of matching audio and video markers.

Finally, FIG. 7 illustrates a preferred logic for determining whether or not a marker is acceptable for use with a particular video transition. For example, the steps of FIG. 7 would be suitable for use with steps 650 and 680 of FIG. 6. For purposes of FIG. 7 it will be assumed that a video discontinuity has been specified and it is desired to locate a marker in the musical work to which to synchronize the associated transition. As an initial step, a base length for the clips that are located on either side of the transition is determined (step 710). The base length is the unedited length of the clip or, alternatively, the preferred time duration of the clip that is to be shown in the video work. Additionally, the maximum and minimum length for each of the bounding video clips will also be determined. These values describe the limitations on the length of the clip that must hold after application of the selected transition at the location of the (to be determined) audio marker. As might be expected, these values will preferably be provided by the user. Additionally or alternatively, the user may specify times at the start and end of the clip beyond which the transition may not extend.

As a next preferred step 715, the instant invention preferably determines a search window for the selected transition. That is, given the user's specified parameter values together with the location of the selected video discontinuity, it is possible to determine a range of times over which to search for audio markers. For example, if the video transition that is under consideration occurs at 2 minutes and the user has specified that no more than ten seconds at the end of the leading clip and ten seconds at the start of the trailing clip may be obscured, the search window would be from 1 minute 50 seconds to 2 minutes 10 seconds. Audio markers that fall outside of this range could not possibly satisfy the time limitations imposed by the user and, hence, typically need not be examined for this purpose.

Next, the instant method preferably enters a search loop 720 through 745 in which the audio markers located previously are each examined in turn to determine whether or not any of them would be suitable for use. Step 720 describes the selection of a first or next (as the occasion warrants) audio marker. Note that if the user has not elected to perform an advanced analysis, the audio markers could simply be examined sequentially in time order (e.g., in order of increasing time within the search window starting, say, with the earliest time) until an acceptable marker has been identified. However, if the user has opted instead to perform an advanced analysis, the program will preferably initially select only those audio markers corresponding to the highest priority criterion (e.g., only those markers associated with significant changes in on-screen illumination) and those markers will first be examined to determine whether or not any of them can satisfy the various time constraints imposed by the user, e.g., will the resulting clip length assuming this marker is chosen be below the minimum allowable clip length (step 725) or above the allowed maximum clip length (step 740). If that should occur, another marker from within the highest priority category will be examined, etc. Then, if a suitable audio marker is located (step 750), the search algorithm will end and the selected audio marker will be applied. On the other hand, if none of the highest priority markers are suitable, the instant algorithm will preferably move to an examination of the next-highest priority markers, etc. If none of the markers from any category prove to be satisfactory, the preferred embodiment will terminate (step 745) and leave that junction unmodified, although other alternatives are certainly possible.

Those of ordinary skill in the art will recognize that a video transition might be synchronized with an audio marker in many different ways. For example, the starting (or ending) point of the transition might be adjusted to occur at the time of the audio marker. This configuration might be desirable if, for example, a quick fade-to black were timed to occur at an identified crescendo in the music and, thereafter, the fade up into the next clip occurred in concern with a building of the volume in the music. As another example, the middle (or any other point occurring during the transition) might be adjusted to coincide with a change in key of the music. For instance, consider a case where the midway point of an iris effect is timed to coincide with a change in musical key (or rhythm, tempo, etc.) in the audio work, thereby providing a suggestion to the listener that the subsequent clip will be different in some way from the foregoing one. Thus, the transition is adjusted so that the audio marker falls sometime during the application of the transition. In broadest terms, synchronization as used herein will be interpreted to mean adjusting a parameter of the transition (e.g., duration, time-location of the middle of the transition, speed of the effect(s), light intensity, volume/type of sound effects, etc.) so that some recognizable aspect of the transition is made to occur at a time proximate to that of at least one of the audio markers.

Although the text contained herein has largely been concerned with using a single audio marker and a single video transition, those of ordinary skill in the art will recognize that a transition might be synchronized with multiple audio markers in some instances. For example, if selected video transition is a spinning cube (e.g., one face of the cube contains the ending clip and another face contains the starting clip), the rate of rotation of the cube might be made to coincide with successive beats in the music, i.e., it would rotate in time to the music. As another example, a dissolve might start—reverse briefly—and then continue to its end as the volume of the accompanying music increases—decreases briefly—and then increases again. Clearly, those of ordinary skill in the art will be capable of devising many alternatives to these schemes.

Finally, and in still another preferred embodiment, there is provided a method of aligning audio and video works substantially as described above, but wherein the algorithm optionally may be allowed to automatically adjust the lengths of the various video clips in order to obtain a better alignment. By way of explanation, a principal application of the instant invention is to operate on a video work that a user has already taken the time to create from a collection of video clips. The user will typically already have selected points in the video work where transitions are to be placed and further indicated the specific type of transition that is to appear there. The method taught herein would then act on that essentially completed video work and adjust the user's transitions to align them with automatically selected audio markers to enhance the multimedia viewing experience. However, in another preferred embodiment, the video clips will be shortened or lengthened as part of the alignment process. That is, the video clips that are adjacent to a video marker that is to be matched to an audio marker will optionally be either prolonged or shortened as is needed. Note that this will be feasible in many cases because the full length of the clip has not been selected for viewing by the user, so that additional running time is available if needed.

Additionally, it should be noted that in some cases one or more individual digital images (e.g., digital photos) will be inserted into the video track, the idea being that an image will be displayed within the video work for a period of time specified by the user. In such a case, there will be no actual clip "length" and the problem of shortening/lengthening a clip to cause a video marker match an audio marker is reduced to deciding how long to display the selected image. Finally, it should be noted that—the video representation of the digital image need not be absolutely static but could, of course, include real-time effects such as inward/outward zooming, panning across the image, etc. which might be used to create the impression of motion in an otherwise motionless digital image. The determination of the amount of the video clip to trim or add preferably takes place during the alignment process and after selection and the final application of the transition at the new position is carried out by a program logic which comes into effect at the time the transition is moved to the new position. The preferred logic uses several data values to achieve the final result. For example, this operating logic preferably uses the total/unedited running time of each clip together with the actual running time of each clip in the multimedia work to constrain the alignment process. For example, the preferred program logic allows a transition to be used at a new position if the running time of the transition, when added to the running time of the clip that results from applying the transition, is less than the total running time of that clip. If not, the next audio marker is preferably selected and the previous analysis repeated using the newly-selected marker.

Figure 9:
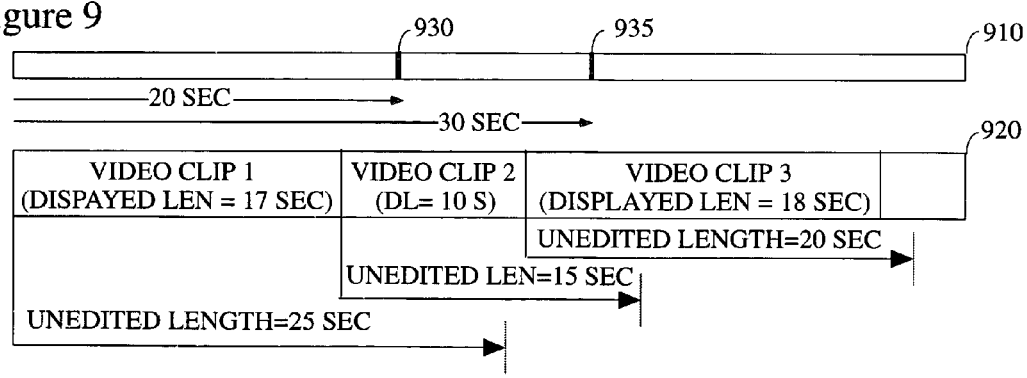
FIG. 9 contains an example that illustrates one preferred method of aligning video clips with audio markers according to the instant invention.

The following example is offered to illustrate further the operation of one preferred embodiment of the instant invention, wherein the video clip lengths are shortened or lengthened to cause them to match the markers in the musical work. As is generally indicated in FIG. 9, two audio markers 930 and 935 have been detected within the audio track 910, one at 20 seconds and another at 30 seconds respectively. The video track 920 will be assumed to contain at least three video clips. In this example, video 1 has a displayed length of 17 seconds and an unedited length of 25 seconds. Video clip 2 has a displayed length of 10 seconds and an unedited length of 15 seconds. Finally, video clip 3 has a displayed length of 18 seconds and an unedited length of 20 seconds. Said another way, each of the video clips has been edited to shorten its visible playtime from its original (unedited) length to the length indicated in the figure.

Given this arrangement, the instant invention would preferably proceed as follows. The first audio marker will preferably be selected. It will then be noted that this audio marker is located 3 seconds into video clip 2 or, alternatively, 3 seconds after the ending of video clip 1. Next, it will be determined that the unedited length of video clip 1 is 25 seconds so there are an additional 8 seconds (i.e., the difference between 17 and 25 seconds) available that could be used in the video work if so desired (i.e., its play-time could be extended). Thus, one feasible way of moving the transition between the first two clips to coincide with marker 930 is to extend the length of video clip 1 by three seconds.

Next, an inquiry will preferably made as to whether it would be possible to lengthen video clip 1 by the requisite amount and correspondingly shorten the length of video clip 2 so as to cause the transition between the first two video clips to coincide with audio markers 930 and to leave the transition between video clips 2 and 3 unmoved. Thus, it will preferably next be determined as to whether under the current rule structure it would be possible to shorten video clip 2 by three seconds. If so, that operation (i.e., lengthening clip 1 and shortening clip 2) will preferably be performed. Note that video clip 2 might be shortened either by removing time from the start or end of the clip. For purposes of illustration, it will be assumed to be removed from the end.

Then, as a next step, the algorithm will preferably attempt to synchronize the transition between video clips 2 and 3 with audio marker 935. Note that, after the previous steps, video clip 2 has a displayed length of 7 seconds, which means that if needed it could be extended by as much as 8 seconds. Next, the time-difference between the marker 935 at 30 seconds and the closest video transition (i.e., the one between video clips 2 and 3) will preferably be calculated to be three seconds (30 seconds−(20 seconds+7 seconds)). Thus, one preferred method of synchronizing the transition between clips 2 and 3 with the marker 935 is carried out by extending the displayed length of video clip 2 by three seconds. Of course, that will only be possible if additional video footage is available (which it is). Recall, that video clip 2 could be lengthened by as much as eight seconds (i.e., the current displayed length is 7 seconds out of a total unedited length of 15 seconds). Thus, by adding three additional seconds to video 2 (preferably at its end where the same amount of video footage was removed previously) the transition between video clips 2 and 3 may be moved to the 30 second time point where it will coincide with audio marker 2. Finally, it is preferred that video clip 3 be shortened by three seconds, so that its end point does not move, preferably at its ending although that choice could be left to the user. Of course, all of the foregoing was done under the assumption that none of the operations would cause any of the video clips involved to be shortened or lengthened beyond a permitted value.

Note that it is anticipated that the preferred method of extending and shortening a video clip will use conventional video editing techniques to make more or less of a video clip viewable within the video work. However, those of ordinary skill in the art will recall, as has been discussed previously, that alternatively (or perhaps in conjunction with the previous steps) a video effect could be chosen that overlays less or more of the selected video clips, thereby effectively obscuring the actual transition point between the two clips and making it appear as though the transition coincides with the audio marker. As an example, and returning to the scenario discussed in the previous paragraphs in connection with FIG. 9, rather than actually shortening or lengthening video clips 1 and 2, a multi-second transition (e.g., the transition might be a long fade-to-black followed by an abrupt return to full brightness at the following video frame) might be applied which would overlay the start of video clip 2 (and possibly the ending of video clip 1) and end at the time point that corresponds to audio marker 930, thereby making video clip 2 fully viewable again beginning at 20 seconds into the video work. Thus, for purposes of the instant invention when the viewable portion of a clip is described as being "shortened" that term should be understood to include shortening of its viewable portion by displaying fewer frames as well as shortening it by obscuring a portion of that clip with a video transition effect. Similarly, when the viewable portion of a clip is "lengthened" that term should be understood to include making additional frames visible using conventional video editing methods or decreasing the coverage of transition effects, thereby uncovering more of the clip. Further, it should be remembered that in those instances where a clip is to be lengthened beyond its unedited length, there are any number of conventional methods of increasing the displayed length of a video clip even if additional video frames are not available.

Finally, it is certainly possible that a user might not object to having the instant program relocate video clips in time in order to synchronize one or more video transitions with musical markers. That is, in still another preferred embodiment the instant invention might optionally operate as follows. Assume for purposes of illustration, that a video marker has been selected at the junction between two time-adjacent video clips. Suppose further, that it is possible that shortening the viewed length of the leading clip brings the junction into alignment with the selected audio marker. In this embodiment, in contrast to what was done previously, the first clip would be shortened to cause the end of this clip to at least approximately coincide with the audio marker. Then, the clip that follows would be slid in time to cause its start time to once again abut the ending of the now-shortened clip. Preferably, the clips that follow would be similarly moved, so that the net result would be—unless other adjustments were made—a corresponding shortening in the play time of the video work. This would, of course, have the benefit of leaving the second/later clip (and the clips that follow) completely unmodified which might be desirable in some circumstances. Of course, it should be clear that this idea could readily be incorporated into the preferred embodiments discussed previously. That is, some combination of shortening/sliding and modification of the transition parameters could certainly be used. In most circumstances, this will preferably be left to the desires of the user.

CONCLUSIONS

Of course, many modifications and extensions could be made to the instant invention by those of ordinary skill in the art. For example in one preferred embodiment the user will select the instant invention to create a random soundtrack that is with a composed video work. In another preferred arrangement, the instant invention can be used to create dynamic photo stories by adding an audio soundtrack to a series of still digital images and synchronizing the display of those images with markers in the audio work.

It should be noted that, although text of the instant disclosure has often referred to selecting video markers based on "discontinuities" in the video work, that term should be understood in its broadest sense to include any sort of video event to which a computer or a user might assign a video marker and wish thereafter to apply a transition to the video data in the vicinity of that marker.

Thus, the present invention is well adapted to carry out the objects and attain the ends and advantages mentioned above as well as those inherent therein. While the inventive devices and/or methods have been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of aligning a video work with an audio work, wherein said audio and video works are configurable to be played in concert with each other, and wherein there is provided an active video transition effect, comprising the steps of:
   a. automatically selecting a plurality of first audio markers in said audio work according to a first criterion, each of said selected audio markers having a first audio time of occurrence associated therewith;
   b. automatically selecting a plurality of second audio markers in said audio work according to a second criterion, each of said selected second audio markers having a second audio time of occurrence associated therewith;
   c. determining a priority of use of said first and second audio markers;
   d. identifying at least one video marker within said video work, each of said identified video markers having a video time of occurrence associated therewith;
   e. selecting from among said first audio markers at least one first audio candidate marker, each of said selected first audio candidate marker having a time of occurrence proximate to said video time of occurrence;
   f. selecting from among said second audio markers at least one second audio candidate marker, each of said selected second audio candidate marker having a time of occurrence proximate to said video time of occurrence;
   g. selecting one of said at least one first and at least one second candidate markers according to said determined priority;

h. automatically synchronizing said active video transition effect with said selected candidate audio marker by at least adjusting a time duration of said active video transition effect;
i. applying said synchronized active video transition effect to said video work proximate to said video marker, thereby creating an aligned video work; and,
j. storing said aligned video work on a computer readable medium.

2. A method of aligning a video work with an audio work, wherein said audio and video works are configurable to be played in concert with each other, comprising the steps of:
 a. selecting a plurality of audio criteria, wherein each of said selected plurality of audio criteria at least comprises a rule for identifying change points within said audio work;
 b. assigning a priority to each of said selected audio criteria;
 c. selecting a highest priority audio criterion from among said plurality of audio criteria;
 d. using each of said selected plurality of audio criteria to identify at least two change points within said audio work, each of said at least two change points being associated with said assigned priority of said audio criteria used to select it, thereby identifying a plurality of audio markers within said audio work, each of said plurality of audio markers having one of said assigned priorities associated therewith;
 e. identifying at least one video marker within said video work, each of said identified video markers having a video time of occurrence associated therewith;
 f. selecting one of said identified video markers and said video time of occurrence associated therewith;
 g. selecting an active video transition effect to apply at said selected video marker;
 h. automatically selecting one of said plurality of audio markers according to said priority associated therewith, wherein said time of occurrence of said selected audio marker is proximate to said video time of occurrence of said selected video marker;
 i. automatically synchronizing said active video transition effect with said selected audio marker by only adjusting a time duration of said active video transition effect;
 j. applying said synchronized active video transition effect to said video work proximate to said video marker, thereby creating an aligned video work; and,
 k. storing said aligned video work on a computer readable medium.

3. A method of aligning a video work with an audio work according to claim 2, wherein step (h) comprises the steps of:
 (h1) choosing one of said plurality of audio markers, wherein said time of occurrence of said selected audio marker is proximate to said video time of occurrence of said video marker,
 (h2) determining from a provided criterion for determining whether said chosen audio marker is suitable for use with said selected video marker,
 (h3) if said chosen audio marker is determined to be suitable for use with said selected video marker, selecting said chosen audio marker,
 (h4) if said chosen audio marker is determined not to be suitable for use with said selected video marker according to said criterion, performing steps (e1) through (e3) until either one of said chosen audio markers is found to be suitable or until all of said plurality of audio markers have been chosen, and,
 (h5) if after performing steps (e1) through (e4) none of said plurality of audio markers is suitable for use with said selected video marker, taking no further action with respect to the selected video marker.

4. A method of aligning a video work with an audio work according to claim 2, comprising the further steps of:
 (l) reading said stored aligned video work from said computer readable media; and,
 (m) playing said aligned video work on a display device.

5. A method of aligning a video work with an audio work according to claim 2, wherein said computer readable medium is selected from the group consisting of computer RAM, non-volatile RAM, magnetic disk, a RAM card, optical disk, magneto-optical disk, and a floppy disk.

* * * * *